United States Patent [19]

Blauhut et al.

[11] Patent Number: 5,395,576
[45] Date of Patent: Mar. 7, 1995

[54] PROCESS FOR PRODUCING FIBER-REINFORCED THERMOPLASTIC MATERIAL WITH A DOUBLE-BELT PRESS

[75] Inventors: Wilfried Blauhut, Linx; Hermann Prokschi, Untergaisbach; Michael Begemann, Altenberg; Günther Erlacher, Gellneukirchen; Wolfgang Hasler, Enns, all of Austria

[73] Assignee: PCD Polymers Gesellschaft m.b.H., Schwechat-Mannswörth, Austria

[21] Appl. No.: 131,397

[22] Filed: Oct. 5, 1993

[30] Foreign Application Priority Data

Oct. 5, 1992 [AT] Austria ............... 1962/92

[51] Int. Cl.⁶ ............................................. B29C 43/38
[52] U.S. Cl. .................................... 264/166; 100/151; 156/583.5; 264/174; 264/169; 425/329; 425/371; 425/DIG. 119
[58] Field of Search ............. 425/329, 371, DIG. 119; 264/174, 257, 169, 166; 156/583.5; 100/151

[56] References Cited

U.S. PATENT DOCUMENTS

| | | | |
|---|---|---|---|
| 3,408,690 | 11/1968 | Jacob | 425/371 |
| 3,462,795 | 8/1969 | Hermanns | 425/371 |
| 3,487,143 | 12/1969 | Bengwall | 425/371 |
| 3,594,866 | 7/1971 | Skinner et al. | 425/371 |
| 3,736,082 | 5/1973 | Wick et al. | 425/371 |
| 3,988,098 | 10/1976 | Kato et al. | 425/371 |
| 4,105,387 | 8/1978 | Ahrweiler | 425/371 |
| 4,330,249 | 5/1982 | Petersson et al. | 425/329 |
| 4,375,350 | 3/1983 | Sato | 425/371 |
| 4,573,404 | 3/1986 | Held | 425/371 |
| 4,642,153 | 2/1987 | Lohr | 156/583.5 |
| 4,714,015 | 12/1987 | Stäbler | 425/371 |
| 4,844,766 | 7/1989 | Held | 425/371 |

FOREIGN PATENT DOCUMENTS

| | | |
|---|---|---|
| 0484735 | 5/1992 | European Pat. Off. |
| 1060783 | 4/1954 | France ............... 425/329 |
| 2948235 | 6/1980 | Germany . |
| 2923036 | 12/1980 | Germany . |
| 3347877 | 7/1985 | Germany . |
| 4002214 | 8/1991 | Germany . |
| 4110041 | 5/1992 | Germany . |

OTHER PUBLICATIONS

English abstract of German specification 2923036, Dec. 11, 1980.
English abstract of German reference 41 10 041, May 14, 1992.

Primary Examiner—Jay H. Woo
Assistant Examiner—Robert B. Davis
Attorney, Agent, or Firm—Wenderoth, Lind & Ponack

[57] ABSTRACT

Process for producing fiber-reinforced thermoplastics in a double-belt press in which the lateral sealing of the press space is formed from a porous profile which is mechanically supported against being laterally forced out and moistened with water before it enters the press.

6 Claims, 2 Drawing Sheets

PROCESS FOR PRODUCING FIBER-REINFORCED THERMOPLASTIC MATERIAL WITH A DOUBLE-BELT PRESS

BACKGROUND AND PRIOR ART

Composite materials consisting of a thermoplastic matrix and reinforcing fibers, preferably glass fibers, are of increasing interest in many branches of industry, in particular in the automobile industry. Materials which are processed by forming sheet-shaped semifinished products, in particular by flowmolding, are of particular interest in this regard. The best known materials of this kind are glass mat-reinforced thermoplastics (GMT).

For the production of composite materials of this kind, double-belt presses are preferably used for reasons of economy. DE-A-29 48 235 describes a development of the process which is particularly economical from a thermal point of view and in which the thermoplastic is introduced in a molten form. However, the formation of the sheet edge is unsatisfactory in this process. The undefined flowing of the material at the edge results in a relatively wide edge zone of the sheet in which the glass content and sheet thickness fluctuate greatly, so that considerable wastage results.

DE-A-33 47 877 describes a double-belt press for producing chipboards, fiberboards, plywood, electrical laminates or the like in which press a wire in a groove at the outer edges of the belts is carried along at the same speed as the material being pressed. When high pressures are used, such as in the production of GMT from thermoplastics, this lateral sealing, however, does not meet the aim, since the wire is forced out laterally by the material being pressed. In addition, the wire does not provide any sealing in the feed region of the belts.

DE-A-29 23 036 describes a double-belt press for producing rubber belts reinforced with steel cable inserts which are suitable as conveyor belts. Lateral sealing is provided by co-running rubber belts which are supported by bolts fastened on the press belts. Such a double-belt press would not be suitable for producing fiber composite materials from a thermoplastic matrix and glass fiber mats, since simple rubber belts would not stand up to the thermal and mechanical stresses occurring there.

According to EP-A-Q 484 735, the problem of lateral sealing is to be solved by laterally co-running belts consisting of rubber containing reinforcing inserts. In particular, metal link belts are proposed which are coated with a silicone rubber. In the event of an increase in pressure, the belts yield outwardly, the pressure which can be exerted on the material being pressed, however, being limited by the force which can be transmitted to the belts by means of friction. This process is therefore not suitable for pressing at high pressures, which is desirable in the interest of product quality.

Since the belt yields outwardly even in the case of pressure fluctuations within the tolerance limit, a non-uniform edge results which occurs as waste.

BRIEF SUMMARY OF THE INVENTION

Unexpectedly, it has now been possible to find a simple process for producing fiber-reinforced thermoplastic material in which the edge losses are very low.

Accordingly, the invention relates to a process for producing fiber-reinforced thermoplastic material by introducing and pressing thermoplastic and fiber reinforcement in a heatable and coolable double-belt press with circulating endless steel belts with lateral sealing of the press space, characterized in that the lateral sealing is formed from a porous profile which is mechanically supported against being laterally forced out.

DETAILED DESCRIPTION

The thermoplastic used is, for example, thermoplastic polyesters, polyethylene, polyamides or polypropylene and copolymers thereof. Preferably polypropylene or polyamides are used.

Figure 1:
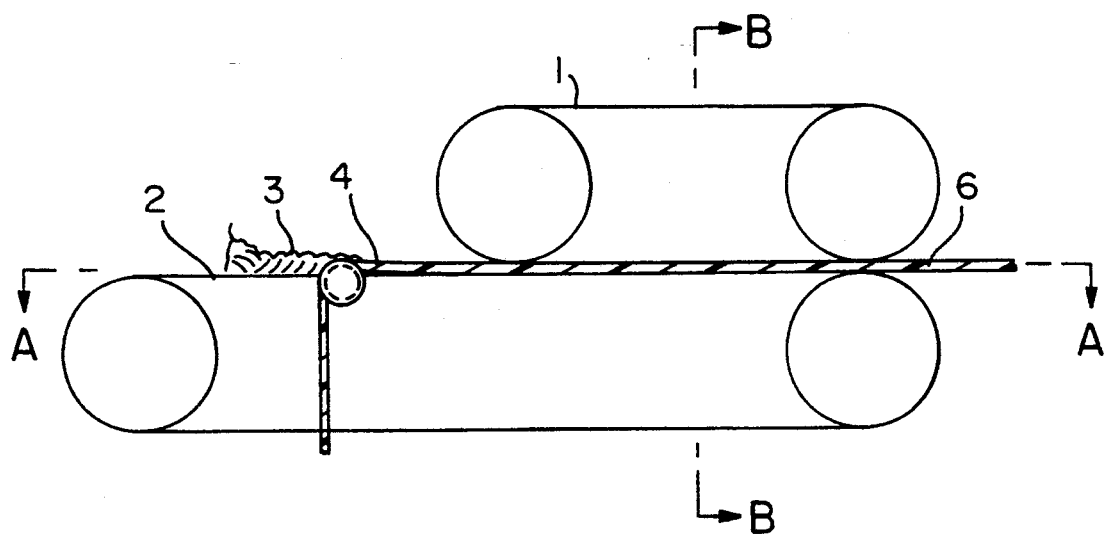
FIG. 1 shows a lateral view of a double-belt press including the feed of the porous profile, but without the lateral sealing.

For carrying out the process, the thermoplastic material is preferably extruded in molten form, by means of one or more sheet dies, between two or more fiber mats or scrims and introduced with the latter into the double-belt press e.g., as shown in FIG. 1 and pressed therein.

In order that the material being pressed is not forced out of the press laterally, the press space is sealed laterally with the aid of a porous profile which is mechanically supported such that, for its part, it is not forced out laterally. The lateral support can take place by means of a support co-running with the belts or else by a support fixed in the machine.

The lateral sealing is provided by a porous profile which, if necessary, is moistened before being introduced into the double-belt press. It may be a round cord, a rope, a braided cord or a cable, however it may also be a strip of felt, non-woven fabric or foam. It may consist of a material of a different or the same kind as the thermoplastic.

With reference to FIGS. 1 to 4:

1 represents the upper steel belt of the double-belt press;

2 represents the lower steel belt of the double-belt press;

3 represents a thermoplastic material and fiber reinforcement before pressing;

4 represents the porous profile;

6 represents the fiber reinforced thermoplastic material after pressing;

7 represents support for porous profile 4 fixed on the double-belt press; and 8 represents support for porous profile 4 corunning with the steel belts.

Figure 2:
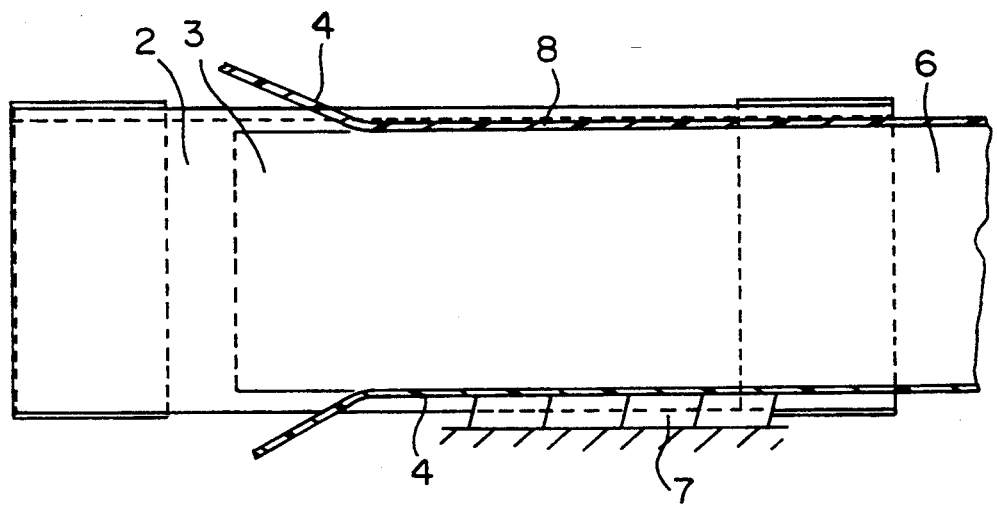
FIG. 2 is a horizontal section along A—A in FIG. 1, showing in one section two embodiments for supporting the porous profile.

In FIG. 2, 7 is the support fixed on the double-belt press. 8 is one of the support points corunning with the steel belts. In practice either 7 or 8 is used.

Figure 3:
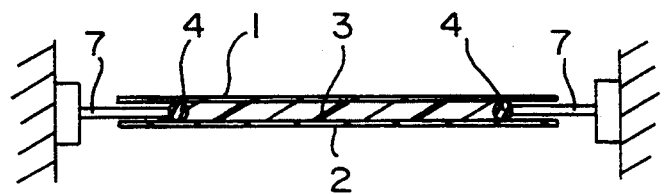
FIG. 3 is a vertical section along B—B, wherein the support is fixed on the double-belt press.

In FIG. 3, the support 7 is fixed in the double-belt press.

Figure 4:
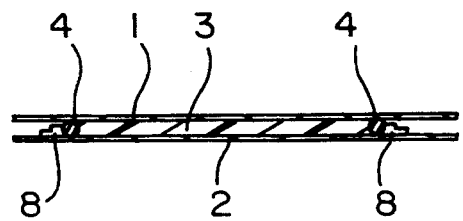
FIG. 4 is a vertical section along B—B, wherein the support is corunning with the steel belts, in this case attached to the lower belt.

In FIG. 4, the support 8 is attached to the lower belt.

Preferably the material of the lateral seal is of the same kind as the thermoplastics and preferably it is moistened with water. In order to reduce the interfacial surface tension, small amounts of conventional interfacial surface-active substances, for example surfactants such as are used in commercial washing-up liquids, may be added to the water. For carrying out the process, there is for example fed along each side of the press a polypropylene cord which is immersed in water and whose original diameter is sufficiently large that, even at the press feed, it is in contact with both steel belts of the press and, during the course of the pressing operation, is compressed to the height of the fiber-reinforced thermoplastic formed. In this manner the lateral sealing is already effective at the commencement of the pressing operation.

During the pressing operation some of the thermoplastic melt occurring at the edge penetrates into the remaining hollow spaces of the porous material and, together with the latter, forms the actual seal. The use of material of the same kind is preferred, and it can be cut off together with the edge region of the fiber-reinforced thermoplastic formed during trimming and directly recycled.

Particularly preferably, the porous profile is moistened with water. If the thermoplastic melt contacts the porous moistened profile, water evaporates and thereby cools the arriving melt which becomes more viscous and finally solidifies, by that considerably improving the sealing effect.

Example

Two layers of glass fiber mat each having a weight per unit area of 900 g/m$^2$ are introduced into an isobaric, hydraulically supported press. PP-melt is extruded with a coating of 2700 g/m$^2$ between the two glass mats. A strip, soaked in a water bath, of needled felt consisting of PP-fibers, 6 mm thick, 10 mm wide, is fed in in each case on both sides. For supporting the sealing strip, there are provided metal sheets which are mounted fixedly laterally in the press, have a thickness of 3 mm and project to a distance of 28 mm between the press belts. The press is operated at a speed of 2 m/min and, in the reaction zone, is subjected to a hydraulic pressure on the belt reverse side of 25 bar. A quasi-homogeneous composite material, that is to say without layer structure, with a completely closed surface, of 3.7 mm thickness and with a density of 1.20 g/cm$^3$ is obtained.

What we claim is:

1. Process for producing fiber-reinforced thermoplastic material in a double-belt press with circulating endless steel belts which comprises lateral sealing of the press space, wherein the lateral sealing is formed from a porous profile, which is mechanically supported against being laterally forced out and moistening the porous profile with water before it enters the press.

2. Process according to claim 1, wherein the porous profile consists of a material which is of the same kind as the thermoplastic material.

3. Process according to claim 1, wherein the porous profile is a round cord, a rope or a braided cord.

4. Process according to claim 1, wherein the porous profile is a strip of felt, non-woven fabric or foam.

5. Process according to claim 1, wherein the porous profile is mechanically supported by a support corunning with the steel belts.

6. Process according to claim 1, wherein the porous profile is mechanically supported by a support fixed in the double-belt press.

* * * * *